UNITED STATES PATENT OFFICE.

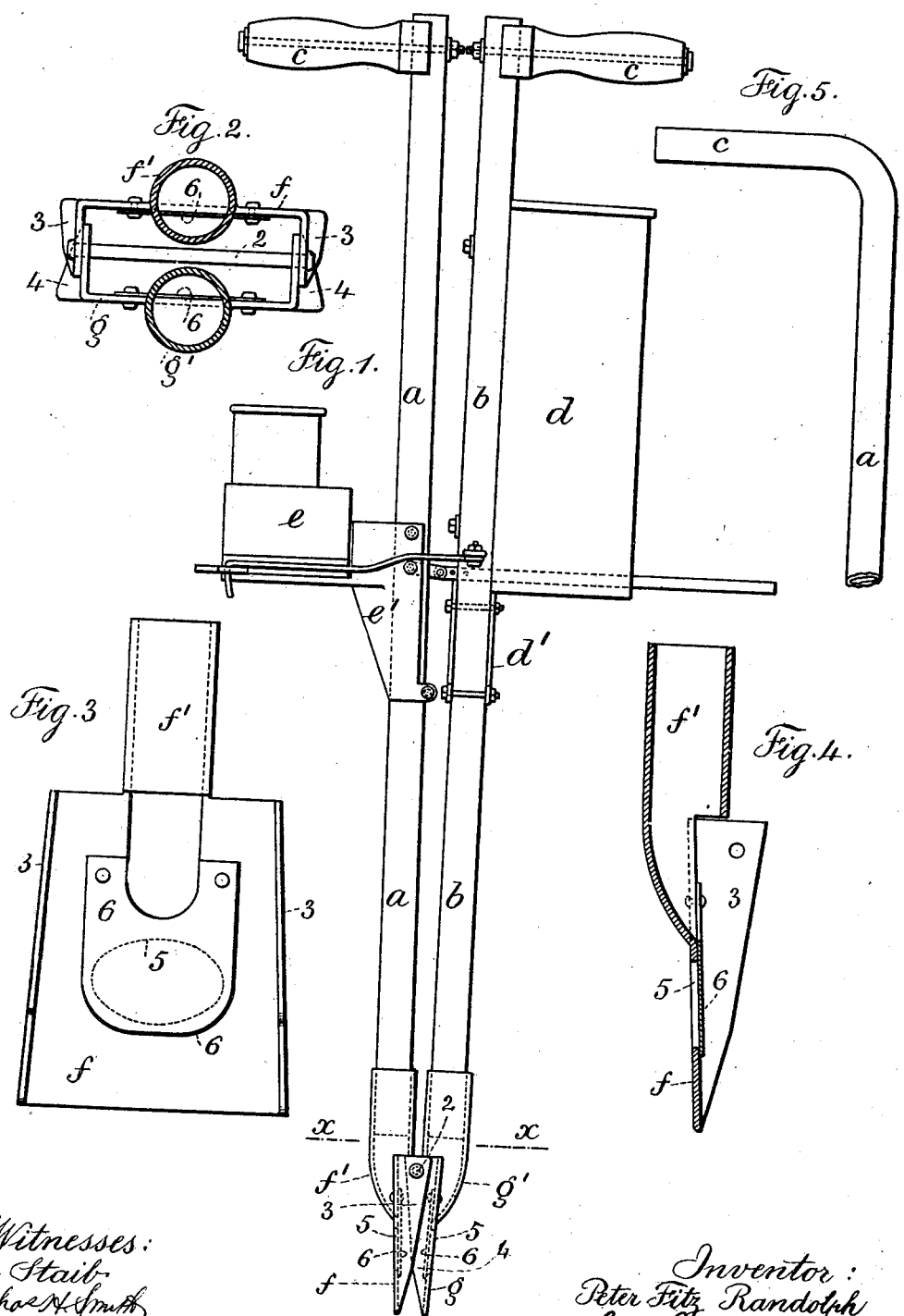

PETER FITZ RANDOLPH, OF LIBERTY CORNER, NEW JERSEY.

SEED-PLANTER AND FERTILIZER-DISTRIBUTER.

SPECIFICATION forming part of Letters Patent No. 668,913, dated February 26, 1901.

Application filed December 8, 1900. Serial No. 39,125. (No model.)

*To all whom it may concern:*

Be it known that I, PETER FITZ RANDOLPH, a citizen of the United States, residing at Liberty Corner, in the county of Somerset and State of New Jersey, have invented an Improvement in Seed-Planters and Fertilizer-Distributers, of which the following is a specification.

Seed-planters and fertilizer-distributers have heretofore been made of two frame parts pivoted together, one part carrying the seed-holder and the other the fertilizer-receptacle. These frame parts have been made of wood and channels have been provided for the delivery of the seed and fertilizer. These implements were not fully operative or efficient, and where made of wood were liable to warp, twist, and get out of shape, and thus become practically useless; and the object of my invention is to provide a strong, durable, and serviceable implement and one nominally unaffected by heat, cold, or moisture.

In carrying out my invention the frame parts are of metal and tubular throughout. They are connected to the sockets of blades having overlapping flanges pivotally connected together, so that the frame parts move toward and away from one another. The seed-holder and fertilizer-receptacle are connected to the frame parts by tubular supports which open into the tubular frame parts, so that the seeds pass down one tubular frame part to the ground and the fertilizer down through the other tubular frame part, and I prefer to make the blades with openings and spring-covers, so as to admit earth between the blades at the desired time.

The tubular frame parts are preferably provided with handles. These handles may be separate from the frame parts and connected thereto, or the frame parts may be bent over to form handles. The seed-holder and fertilizer-receptacle devices are connected so as to operate with the back-and-forth movement of the frame parts; but the same form no part of my present invention.

In the drawings, Figure 1 is an elevation representing my improvement. Fig. 2 is a sectional plan at $x$ $x$ of Fig. 1. Fig. 3 is an elevation of one of the blade ends of the frame parts and the tubular socket formed therewith. Fig. 4 is a vertical section of the parts shown in Fig. 3, and Fig. 5 represents a modified construction of the handle.

The frame parts $a$ $b$ are by preference composed of metal tubes in one piece from the upper end to the blades, and the said parts are pivoted so as to swing toward and from one another. I prefer for these frame parts to employ steel tubes similar to the tubular parts of a bicycle-frame. These frame parts are preferably painted inside and out for their preservation. I have shown and prefer to employ handles $c$ separate from the frame parts and connected thereto by bolts and nuts or in any other desired manner. Instead of these handles the frame parts may be bent over so that there is a straight portion at approximately right angles to the main portion, as shown in the modification, Fig. 5, the bent-over portion forming the handle, or a sleeve or grip may be secured around said end as a more convenient device for the hand to grasp.

$d$ represents the seed-holder, and $e$ the fertilizer-receptacle. These devices may be of any well-known or desired form and do not constitute any part of my present invention. I provide tubular connections $d'$ and $e'$ from the frame parts $a$ $b$ to the seed-holder and fertilizer-receptacle. These are in the form of supporting-brackets—that is, parts that are connected to the frame parts adapted to support the seed-holder and fertilizer-receptacle and that have tubular portions or passage-ways opening into the tubular frame parts $a$ $b$.

I provide blade ends $f$ $g$ to the tubular frame parts. These are formed alike. Each blade end is provided with an integral tubular socket extending upward from one surface of the blade end, with an opening through the blade, the tubular socket being slightly larger than the tubular frame part, so that the frame part passes into the socket and is securely connected thereto by brazing or riveting. The tubular sockets are represented at $f'$ $g'$, and the opposite vertical edges of the blades are provided with flanges 3 4, one blade being slightly wider than the other, so that the flanges overlap, and through the flanges and across between the blades passes a pivot-pin 2, by which the blades are pivoted together and with the blades the tubular frame parts, so that the said frame parts swing toward and from one another on the pivot-pin 2.

I prefer to make openings 5 in the blades *f g*, so as to admit earth between the blades from outside, and these openings are preferably covered on the inner surface of the blades by spring-metal plates 6, forming covers, which are secured, preferably, by rivets to the blades above the openings. In the drawings, Fig. 1 shows the tubular frame parts as swung toward each other and coming as closely adjacent as possible. In this position the blades *f g* are separated. To insert the seed-planter and fertilizer in the ground, the handles are separated, so as to bring the lower ends of the blades together and form a wedge to enter the ground.

The forward-and-backward movements of the frame parts toward or from one another effect the operation of the seed-holder and fertilizer-receptacle; but the same forms no necessary part of my invention. As the handles are brought together in the position shown in Fig. 1 the blades are spread apart in the ground, and this has a tendency to force the earth through the openings 5 between the blades, temporarily moving the spring-metal covers while the earth is being admitted to assist in covering seed and fertilizer.

The device of my present invention is strong, durable, and not at all likely to break, get out of order, or to deteriorate with use or time.

I claim as my invention—

1. In a seed-planter and fertilizer-distributer, the combination with a seed-holder and fertilizer-receptacle, of frame parts carrying the seed-holder and fertilizer-receptacle, and each comprising an integral tube of metal, handles at one end of said frame parts and by which the same are moved, and blades connected to the frame parts at their other ends, and a pivot for connecting the frame parts so that they are adapted to swing toward or from one another, substantially as set forth.

2. In a seed-planter and fertilizer-distributer, the combination with a seed-holder and fertilizer-receptacle, of frame parts carrying the seed-holder and fertilizer-receptacle, and each comprising an integral tube of metal, handles at one end of said frame parts and by which the same are moved, blades at the opposite ends of said frame parts, each blade comprising a flat portion with vertical side flanges and an integral tubular socket opening through the blade, the flanges being connected together by a pin which forms the pivot upon which the tubular frame parts are swung toward and from one another, substantially as set forth.

3. In a seed-planter and fertilizer-distributer, the combination with a seed-holder and fertilizer-receptacle, of frame parts carrying the seed-holder and fertilizer-receptacle and each comprising an integral tube of metal, handles at one end of said frame parts and by which the same are moved, blades at the opposite ends of said frame parts, each blade comprising a flat portion with vertical side flanges, and an integral tubular socket opening through the blade, the flanges being connected together by a pin which forms the pivot upon which the tubular frame parts are swung toward and from one another, and each blade having an opening through the same between the tubular socket and the lower edge, and sheet-metal plates forming covers to said openings secured to the said blades upon the inner opposite surfaces, substantially as set forth.

4. In a seed-planter and fertilizer-distributer, the combination with a seed-holder and fertilizer-receptacle, of frame parts carrying the seed-holder and fertilizer-receptacle, handles at one end of said frame parts and by which the same are moved, blades at the opposite ends of said frame parts each comprising a flat portion with vertical side flanges and an integral tubular socket opening through the blades and receiving the lower ends of the frame parts, the flanges being connected together by a pin which forms the pivot upon which the tubular frame parts are swung toward and from one another, substantially as set forth.

5. In a seed-planter and fertilizer-distributer, the combination with a seed-holder and fertilizer-receptacle, of frame parts carrying the seed-holder and fertilizer-receptacle, handles at one end of said frame parts and by which the same are moved, blades at the opposite ends of said frame parts each comprising a flat portion with vertical side flanges and an integral tubular socket opening through the blades and receiving the lower ends of the frame parts, the flanges being connected together by a pin which forms the pivot upon which the tubular frame parts are swung toward and from one another, and each blade having an opening through the same between the tubular socket and the lower edge and sheet-metal plates forming covers to said openings secured to the said blades upon the inner opposite surfaces, substantially as set forth.

Signed by me this 5th day of December, 1900.

PETER FITZ RANDOLPH.

Witnesses:
GEO. T. PINCKNEY,
BERTHA M. ALLEN.